G. O. HANNAH.
VULCANITE SCRAPER.
APPLICATION FILED NOV. 16, 1921.
1,410,296. Patented Mar. 21, 1922.
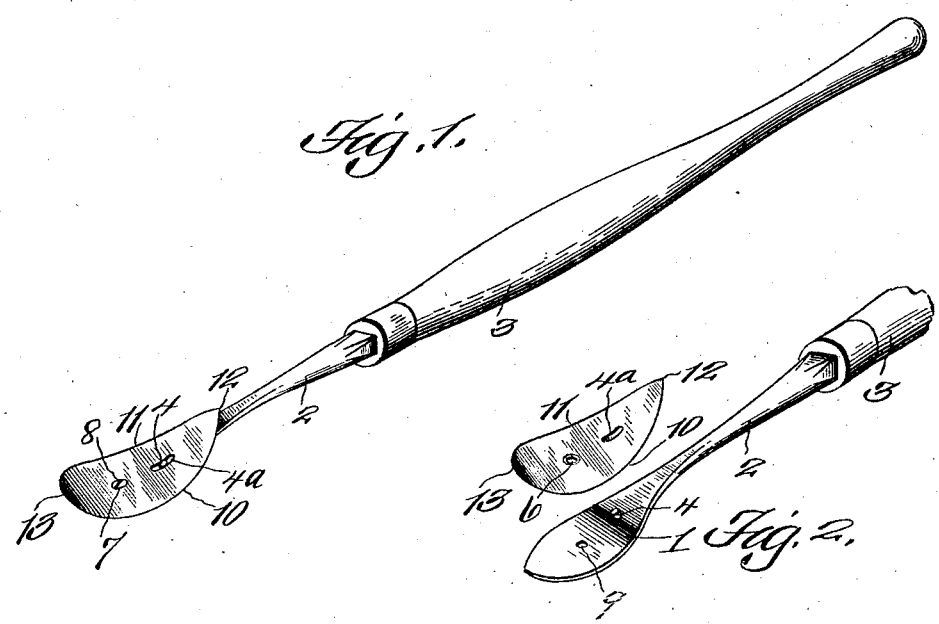
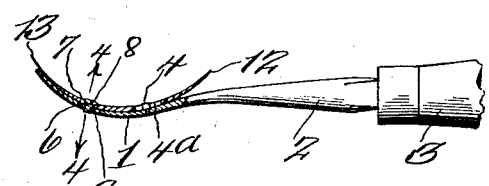
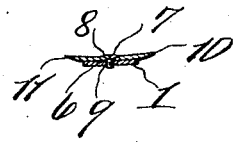
Inventor
George Osborne Hannah,
By Watson E. Coleman
Attorney

UNITED STATES PATENT OFFICE.

GEORGE OSBORNE HANNAH, OF ST. JOHN, NEW BRUNSWICK, CANADA.

VULCANITE SCRAPER.

1,410,296.  Specification of Letters Patent.  Patented Mar. 21, 1922.

Application filed November 16, 1921. Serial No. 515,536.

*To all whom it may concern:*

Be it known that I, GEORGE OSBORNE HANNAH, a subject of the King of England, residing at St. John, in the Province of New Brunswick and Dominion of Canada, have invented certain new and useful Improvements in Vulcanite Scrapers, of which the following is a specification, reference being had to the accompanying drawings.

Tools of this character are used for finishing rubber work, that is rubber plates for artificial teeth.

Most of the scrapers now in use have but one point or rounded end, and when a cutting edge is needed, it is only on one side of the blade of the tool, due to the fact that in using the scraper it is drawn toward the user.

Also the cutting edges on the scrapers heretofore used become dull very soon, since the wire cutting edge is needed. In fact due to the blades of scrapers or tools of this character being too thick, it has been found difficult to retain a wire cutting edge for any length of time.

With these disadvantages in view, the present invention has for its purpose the provision of an auxiliary blade for use in connection with vulcanite scrapers provided with a sharpened point at one end and a rounded cutting edge at the other end, with opposite curved cutting edges, the idea being to provide means for attaching the blade to a vulcanite scraper blade now in use, thereby greatly facilitating the work of finishing the rubber work, that is rubber plates for artificial teeth.

It will be observed that the blade to be attached is curved throughout its length, or otherwise formed, to adhere to the contour of the scraper blade when attached, there being a plurality of openings to receive attaching means for securing the vulcanite scraper blade, whereby the auxiliary blade may be adjusted in various positions.

It will be noted that the present form of auxiliary vulcanite scraper blade is relatively thin, enabling the same to be provided with opposite wire cutting edges, so that either one may be used for finishing rubber plates for artificial teeth.

Due to the fact that the work of finishing rubber plates for artificial teeth require round and sharpened points, and since the present form of auxiliary vulcanite scraper blade can be reversed, by removing the attaching means, so that either point may be used at will, it is possible to facilitate the work of preparing the rubber plates. By using either one of the points, it is possible to use both wire cutting edges instead of one, and since the auxiliary vulcanite scraper blade is relatively thin it will more readily retain its wire cutting edge.

It is to be noted that any suitable support may be used in connection with the auxiliary blade. However in the present instance it is the aim to attach the same to the usual form of vulcanite scraper, thereby utilizing the old handle. It is obvious that a set of vulcanite scrapers of the old style may include a set of blades of the present form, capable of being attached to the various old style scrapers, thereby affording means for renewing any one of the scrapers, and by providing a set of scrapers of this character the work of finishing rubber for artificial teeth may be greatly facilitated.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of the improved auxiliary vulcanite scraper blade, as applied to an old style vulcanite scraper;

Figure 2 discloses collective views of the old style vulcanite scraper, and the auxiliary blade in a reversed position and spaced from the old style scraper, thereby illustrating how the two are connected;

Figure 3 is a longitudinal sectional view on line 3—3 of Figure 1;

Figure 4 is a cross sectional view on line 4—4 of Figure 1;

Referring to the drawings, 1 designates a conventional vulcanite scraper blade, 2 its shank which is fastened in any suitable manner in a convenient handle 3.

The blade 1 has a stud or pin 4 threaded therein, acting as a retaining pin for the auxiliary blade 5. In fact the auxiliary blade 5 is of arcuate shape from end to end, in order to conform to the conventional vulcanite scraper blade, and is provided with an aperture 6 adjacent one end and an elongated slot 4ª adjacent the opposite end. Ordinarily the slot 4ª receives the retaining pin 4, to assist in anchoring the auxiliary vulcanite scraper blade in position. A suitable screw 7 provided with a relatively flat head 8, is designed to pass through the aperture or opening 6, and is threaded into the conventional vulcanite scraper as at 9, preferably at a location substantially centrally of the conventional scraper. By means of the screw together with the retaining pin 4 the auxiliary scraper blade is held detachably and reversibly positioned on the conventional scraper blade. The threaded shank of the retaining pin or lug 4 and the threaded shank of the screw are cut off flush with the under surface of the conventional blade, while the projecting end of the retaining pin, which enters the slot of the auxiliary blade is flush with the concave surface or face of the auxiliary blade, thereby not interfering with working or finishing the rubber plate for artificial teeth. The head of the securing screw is made relatively flat, and the end of its shank is flush with the under surface of the conventional blade, thereby also avoiding any difficulty in finishing the plate for artificial teeth. The head of the securing screw may or may not be countersunk in the face of the auxiliary scraper blade. The head of the securing screw has a screw driver engaging kerf, in order to adjust the securing screw in place.

The auxiliary scraper is provided with opposite curved elongated cutting edges 10 and 11, while one end of the blade is sharpened into a cutting point 12, whereas the other end terminates in a round cutting edge 13.

All vulcanite scrapers during their use, are drawn toward the operator or workman, and it is obvious that when the workman desires to use the round cutting edge 13, one of the elongated side cutting edges may be used, and when the workman desires to use the sharpened cutting point, the opposite side cutting edge may be employed. In either case it will be observed that the scraper is drawn toward the workman or operator. Furthermore it is obvious that the auxiliary blade may be adjusted relatively to the conventional form of vulcanite scraper, and due to the auxiliary scraper blade being relatively thin, its wire cutting edges may be more readily retained, thereby greatly facilitating the finishing preparation of rubber plates for artificial teeth.

The invention having been set forth, what is claimed is:

1. The combination with a conventional vulcanite scraper blade, of an auxiliary vulcanite scraper blade conforming to and engaging the first blade, and means for detachably connecting the second blade to the first blade, whereby it may be adjusted longitudinally of the first blade, or reversed.

2. The combination with a conventional form of vulcanite scraper blade of a curved contour longitudinally, of an auxiliary vulcanite scraper blade correspondingly curved and conforming to and engaging the first blade, the auxiliary blade provided with a sharpened cutting point at one end and a round cutting edge at the opposite end, and provided with opposite longitudinal curved cutting edges, and means for attaching the second blade detachably to the first blade.

3. The combination with a conventional vulcanite scraper blade provided with a retaining pin, of an auxiliary vulcanite scraper blade having a plurality of apertures, any one of which may receive said retaining pin, and means passing through another aperture and detachably engaging the first blade, to hold the auxiliary blade attached, said auxiliary blade having a sharpened cutting point at one end and a cutting rounded edge at the other end, and provided with opposite elongated curved cutting edges.

4. The combination with a conventional vulcanite scraper blade provided with a retaining pin, of an auxiliary vulcanite scraper blade having a plurality of apertures, any one of which may receive said retaining pin, and means passing through another aperture and detachably engaging the first blade, to hold the auxiliary blade attached, said auxiliary blade having a sharpened cutting point at one end and a cutting rounded edge at the other end, and provided with opposite elongated curved cutting edges, said auxiliary vulcanite blade being reversible and adjustable, whereby either point or longitudinal curved side cutting edge may be used in the preparation and finishing of rubber plates for artificial teeth.

5. The combination with a vulcanite scraper blade holder, of a vulcanite scraper blade conforming in curvature to and engaging the holder, and means for detachably connecting the scraper blade to the holder with either end of the blade projecting forwardly from the holder.

6. A vulcanite scraper, comprising a blade holder, a blade applicable thereto, and fastening devices designed to detachably connect the blade and holder together, the blade being formed with openings through which said fastening devices pass, including an elongated opening which will permit the blade to be reversed end for end and fastened to the holder with either end of the blade projecting forwardly.

In testimony whereof I hereunto affix my signature.

GEORGE OSBORNE HANNAH.